UNITED STATES PATENT OFFICE.

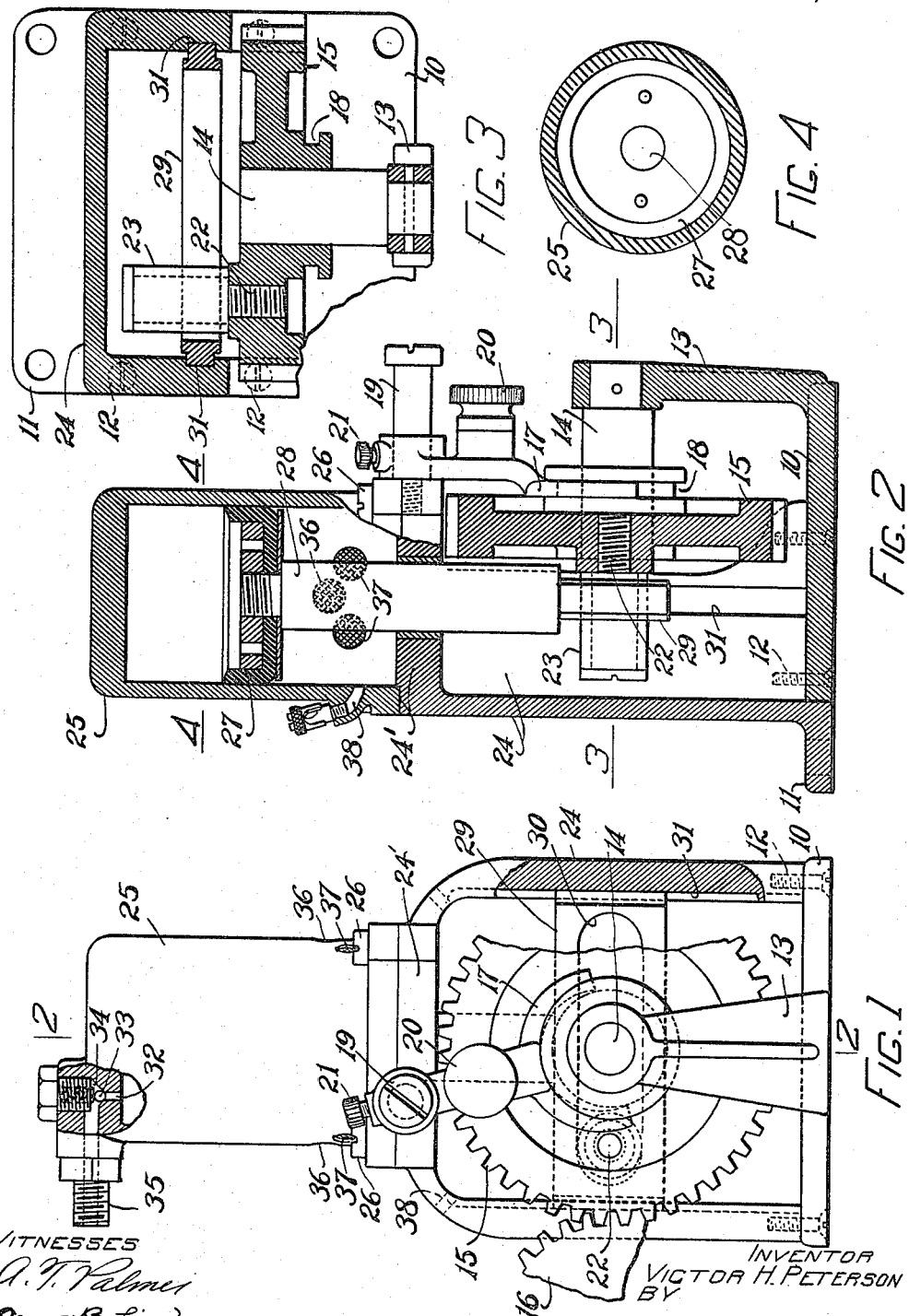

VICTOR H. PETERSON, OF CAMBRIDGE, MASSACHUSETTS.

AIR-PUMP FOR AUTOMOBILES AND THE LIKE.

1,170,458.  Specification of Letters Patent.  Patented Feb. 1, 1916.

Application filed November 4, 1914. Serial No. 870,279.

*To all whom it may concern:*

Be it known that I, VICTOR H. PETERSON, a subject of the King of Sweden, residing at Cambridge, in the county of Middlesex and State of Massachusetts, have invented new and useful Improvements in Air-Pumps for Automobiles and the like, of which the following is a specification.

This invention relates to improvements in air pumps.

More particularly it relates to air pumps designed for attachment to automobiles or the like.

It is among the objects of the invention to provide such a pump at small expense, and of such small dimensions that it can be installed in automobiles that were not originally designed with a place for a pump; and that will, withal, be a practical, efficient and durable piece of mechanism. These objects are accomplished by the construction hereinafter disclosed.

It is the further object of the invention to provide apparatus with other advantages that characterize the construction herein set forth; and it is the object to cover by the appended claims whatever features of patentable novelty exist in the invention disclosed.

In the accompanying drawings, which illustrate an embodiment of the invention: Figure 1 is an end elevation with part broken away in section to the groove 31 of Fig. 2; Fig. 2 is a side elevation in medial section; Fig. 3 is a plan in section on the line 3—3 of Fig. 2; and Fig. 4 is a section through the cylinder at the line 4—4 of Fig. 2.

Upon referring to the drawings the compactness of mechanism made possible by the invention will be understood when it is known that in the drawing accompanying the application for patent the parts are drawn on a full size scale. As depicted, the apparatus has a base formed of two parts 10 and 11 fastened together by any convenient means as by screws 12 in such manner that when separated the mechanism comes apart as will be understood from the description which follows. One of these sections of the base has a standard 13 which carries a stud 14 on which the driving gear 15 revolves. This stud is long enough so that the gear can slide along its axis between a position where it is in mesh with a power gear 16 and another position where it is out of mesh. To effect this movement a fork 17 engages in a groove 18 on the hub of the driving gear, the shank of the fork being arranged to slide on a stationary pin 19; and a handle 20, which may conveniently be merely a screw with knurled head, enables the operator to slide the fork and gear on the two pins 19 and 14 at will. For locking the gear in position in mesh, or out of mesh, a set screw 21 may be provided to pass through the shank of the fork and engage the stationary pin 19. The gear carries a driving pin 22 which preferably has a sleeve mounted loosely upon it to act as a roller in contact with the piston rod which this pin drives.

The other portion of the base has a standard 24 rising to support a platform 24' on which a cylinder 25 is fastened by clamping bolts 26. In the cylinder is a piston 27 having a piston rod 28 passing through a suitable bearing in said platform, and having a cross head 29 in which is a slot 30 extending at right angles to the line of movement of the piston and adapted to receive the roller 23 on the driving pin of the gear. This cross head is of such width that its edges ride in groove bearings 31 in the standard 24. The upright part of the standard 24 preferably is continuous around three sides, thus affording protection to the interior mechanism, and affording protection for fingers of the operator; while on the fourth side it is open for the insertion and play of the driving pin. Preferably the platform 24' stands up high enough to permit the gear 15 to slide under it, so that when the gear is in mesh, the gear is close to the cross head 29 with the driving pin 22 projecting through the cross head. This gives application of power with relatively little distortion. When out of mesh the gear is farther away from the cross head; and the driving pin is long enough so that it does not pull out of the slot in the cross head. Hence it is always in position to be pushed into it to its working position.

The cylinder has a single acting piston 27 having a cup packing. Beyond the inner end of stroke is located a discharge port 32, closed by a spring pressed ball 33 constituting a check valve operating in a chamber 34 whence a discharge pipe 35 leads for conveying the compressed air to any destination. At the other end of the cylinder are a multiplicity of ports arranged at two different levels, the ports 36 being air inlets to the upper side of the piston when it is at its extreme limit of outward stroke, and the ports 37 being open to the under side of the piston at all times.

The operation of the device is as follows: On the inward stroke of the piston the cup packing is tight against the cylinder walls, air is compressed against the head end of the cylinder, and greater part of this air is forced out through the discharge port 32. On the outward stroke of the piston the tendency to create a vacuum in the cylinder draws some air past the edges of the cup packing; and the filling of the cylinder with air at atmospheric pressure is completed when the piston has reached its outer limit of stroke, at which place air can enter freely through the inlet ports 36. Early in the inward stroke these ports are shut off; and the air thus entrapped is compressed and discharged through the port 32 and pipe 35. As the platform 24' closes the mouth of the cylinder air is drawn into it through the ports 37 on each inward stroke of the piston, and is forced out again on the succeeding outward stroke. The temperature resulting from the compression of the air is prevented from heating the apparatus unduly, owing to the cooling draft of air which is thus drawn into the cylinder and forced out again at each stroke, on the outer side of the piston. Suitable oil holes, which may be simple openings 38 through the sides of the standard and cylinder, provide easy means for lubrication.

It is contemplated that the power gear 16 for driving the apparatus may be mounted on the magneto shaft or cam shaft or any other suitable place on an automobile, and that the pump may be placed in proximity thereto by any means of support that may happen to be obtainable. Although it has been spoken of herein as being set and operating vertically, which is the arrangement illustrated and which is generally to be preferred, it is to be understood that it may be set and operated at any angle. The distance of travel of the driving gear between its meshed and unmeshed positions is so slight that the stud on which it is mounted can be held stiffly from a single standard 13. The compactness of the parts is such that this standard and stud are easily held in rigid relation to the cross head and piston guides by the device of making a base in two sections attached together as shown. The cylinder is likewise held in sufficiently accurate alinement considering the nature of the piston packing, by the ease with which it can be secured on the platform 24', integral with the cross head guides on the part 11 of the base, as shown in the drawing. As there is no joint between the piston head and the piston rod; and as the piston rod is kept in an approximately rectilinear path by the grooves and bearing, the leather cup style of packing for the piston permits the piston to fit tightly even when these bearings have become somewhat loose by wear. The alinement of piston rod and guide grooves and piston is easily fixed at the outset. The problem is further simplified by the roller drive, so that friction occasioned by the oscillation of the roller 23 toward either side is of little consequence, and slight imperfection of fit makes no particular difference because the main bearing surface is between the roller 23 and its pin 22, a place where a good fit is easily made. In constructing the pump very little machine work is therefore necessary; and much of that does not need to be of the highest order of precision, and is in places which are easily accessible. The construction by which base part 10 underlies and is separable from the base part in which the cross head grooves run to the bottom permits of easy manufacture and assembly; and the fastening of both base parts to each other by the screws 12, and both to the same support by screws through the holes seen in the corners in Fig. 3 makes the pump as a whole both easily separable and very sturdy.

The pump is reversible, running in either direction with equal effect.

An extension from the handle 20 to the operator's seat may be provided, so that the gear can be put into or out of mesh without leaving the car.

I claim as my invention:

1. An air pump comprising a standard combined integrally with a base part and adapted to guide a cross head and to support a cylinder; said cylinder; a piston in it; a piston rod and cross-head guided in said standard; another standard, integral with another base part; and means supported thereon to engage and drive said piston rod; said two parts of the base being separably joined together with their bottoms in the same plane and with said driving means between their parts that extend thence upward for said supporting purposes.

2. An air pump comprising a standard, with guide grooves for opposite edges of a cross-head, extending to the bottom of the standard, a bearing for a sliding piston rod, and means to support a cylinder; said cylinder; said piston rod, with cross-head; a piston thereon in the cylinder; means under the cylinder for engaging and driving said cross-head; the said standard having upright portions on the two sides where the guide grooves are, and a horizontal portion adapted for attachment to a support on the third side; and a standard for said driving means having an upright on the fourth side with a horizontal part extending under and fastened to the said upright parts of the first mentioned standard.

3. An air pump comprising a standard with guide grooves for opposite edges of a cross-head, a bearing for a sliding piston rod, and means to support a cylinder; said cylinder; said piston rod with cross-head having a slot extending transversely; and driving means movable toward and from the path of the cross-head and having a driving part always in mesh in said slot of the cross-head.

4. An air pump comprising a standard with guide grooves for opposite edges of a cross-head, a bearing for a sliding piston rod, and means to support a cylinder; said cylinder; said piston rod with cross-head having a slot extending transversely; a stud and means to support it; a gear movable on the stud toward and from the path of the cross-head; and a driving pin on the gear, having a rolling casing engaging in said slot.

5. An air pump comprising a standard with guide grooves for opposite edges of a cross-head, a bearing for a sliding piston rod, and means to support a cylinder; said cylinder; a piston having a cup-bearing in the cylinder; said piston rod with cross-head guided in a rectilinear path by said grooves and bearing; and a driving member engaging the cross-head and rolling thereon transversely of its path while driving it longitudinally of said path.

6. An air pump comprising a standard with means for guiding a piston rod and for supporting a cylinder; said cylinder, having ports at its end toward the standard; a piston in the cylinder over-traveling one of said ports for admission of air to be compressed and not over-traveling another port, whereby cooling air enters and leaves back of the piston through the latter port; a discharge port at the other end of the cylinder, with valve; and driving means for the piston.

7. An air pump comprising a two part base, each part being attached to the other and both being adapted to be attached to a support in the same plane; there being on one of said parts a plunger pump, and on the other of said parts driving mechanism continually in mesh therewith.

Signed by me at Boston, Mass., this second day of November, 1914.

VICTOR H. PETERSON.

Witnesses:
JOSEPH T. BRENNAN,
EVERETT E. KENT.